Nov. 22, 1955     A. A. KOTTMANN     2,724,351
COOKIE MACHINES
Filed Jan. 13, 1953     2 Sheets-Sheet 2
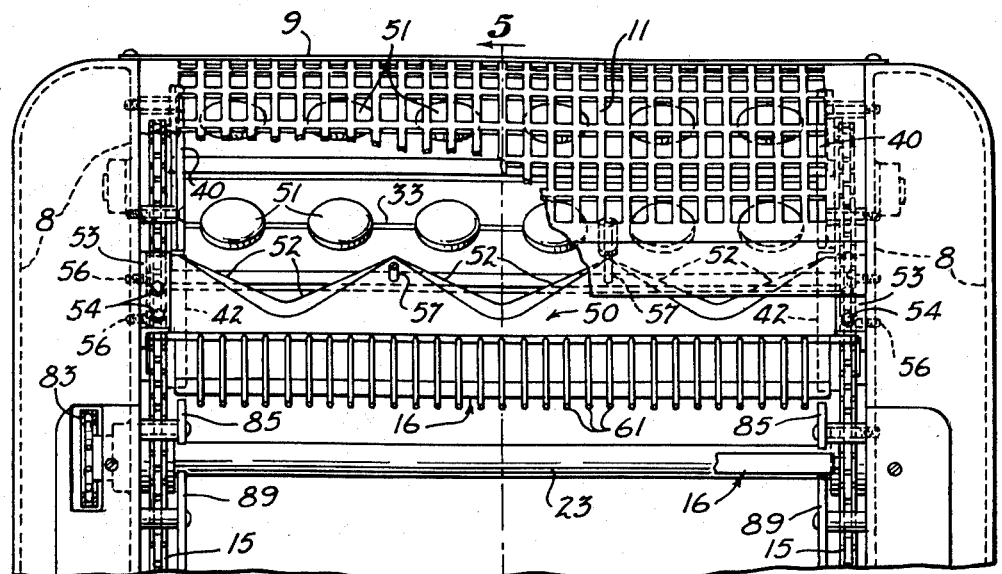
Fig. 4
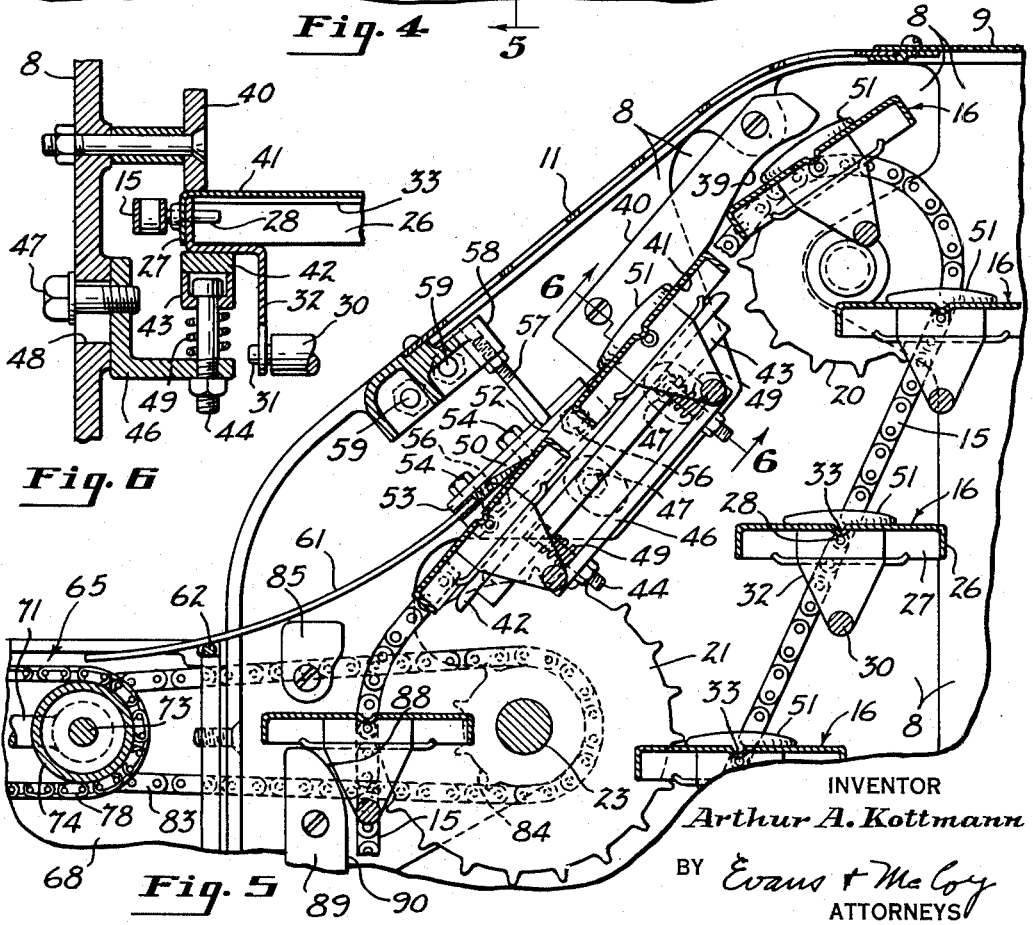
Fig. 6
Fig. 5
INVENTOR
*Arthur A. Kottmann*
BY *Evans & McCoy*
ATTORNEYS United States Patent Office 2,724,351
Patented Nov. 22, 1955

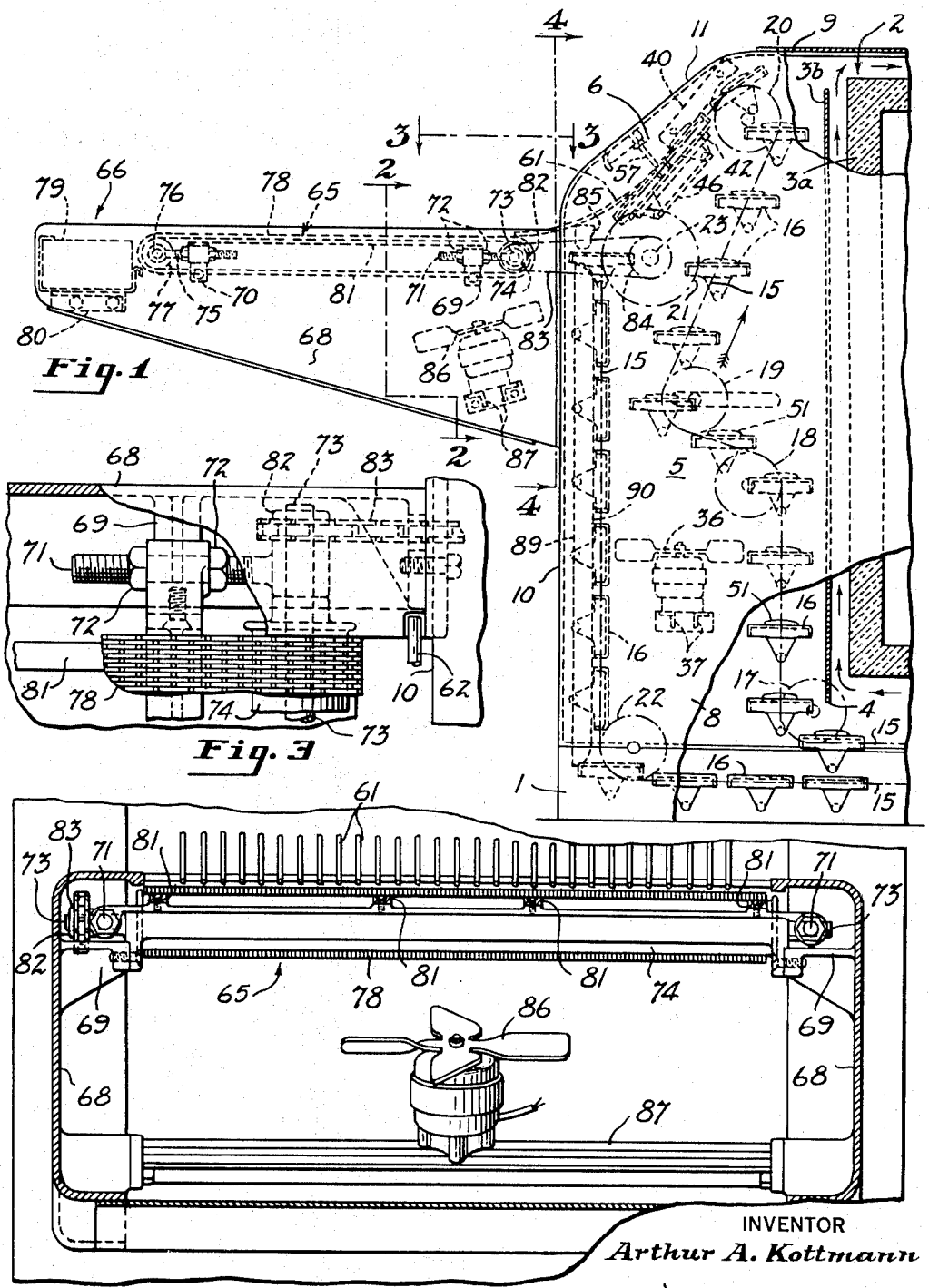

2,724,351

COOKIE MACHINES

Arthur A. Kottmann, Davenport, Iowa, assignor, by mesne assignments, to Frank C. Wallace, Bettendorf, Iowa Application January 13, 1953, Serial No. 331,097

9 Claims. (Cl. 107—57)

This invention relates to automatic baking equipment for receiving a batter or dough and forming it and baking it during its passage through the machine to produce finished baked goods. More particularly the invention relates to an automatic machine for making cookies.

This application is a continuation-in-part of my prior, copending application, Serial No. 170,588, filed June 29, 1950, for Cookie Machines. The present application is directed primarily to the portion of the machine of the prior application in which the finished baked goods are cooled and from which they are finally removed. As disclosed in said prior application, the complete machine for commercial bakery operations may comprise a dough hopper equipped with feed rolls and forming dies for extruding dough in desired shapes at a controlled rate; an associated cut-off mechanism for cutting the dough into sections of the desired thickness as it emerges from the forming dies; an oven of any suitable design; an endless chain conveyor that carries a multiplicity of trays in uniformly spaced relationship along the length of the conveyor, the conveyor path being arranged to move the trays sequentially under the hopper forming dies for receiving formed pieces of dough, then through the oven to bake the dough, then through a suitable cooling zone to a take-off mechanism for removing the finished baked goods from the trays, and finally back to the starting position. Of great importance to the satisfactory operation of a machine of this character is the design of the cooling zone and take-off mechanism. Unless properly cooled before removal from the trays, a large percentage of the baked goods emerging from the oven are likely to be damaged to a degree rendering them unsalable. Also, the baked goods must be properly handled upon removal from the trays to deliver them undamaged and at a proper rate to a location where they can be mechanically or manually collected for packaging or temporary storage. This requires further cooling for the baked goods to withstand handling during removal from the machine, packaging, etc. For a detailed disclosure of a complete machine of this character, reference is made to my above-mentioned copending application.

The present application is concerned only with the design and construction details of the cooling zones and the take-off and delivery mechanisms of the character described, together with certain related details of the oven, conveyor, and tray constructions. The remainder of this specification and the drawings are devoted exclusively to these parts of the complete machine. In this connection, it will be understood that the present invention is not limited to use in combination with any particular mechanism for forming and baking the goods, but is broadly directed to the cooling, removal, and delivery of baked goods, however they may be formed and baked, and to such details of the tray, oven, and conveyor constructions as are necessary or desirable to proper performance of the cooling, removal, and delivery functions.

A general object of the invention is to provide an improved combination of a tray conveyor, cooling means, take-off mechanism, and delivery mechanism for removing baked goods from an endless conveyor and delivering them undamaged and at a proper rate for convenient collection.

More specific objects of the invention are to provide an improved means for efficiently cooling baked goods emerging from an oven as they are carried on a series of trays of an endless conveyor from the oven to a mechanism for removing the baked goods from the trays; to provide an improved take-off mechanism for freeing the baked goods from the trays and feeding them to a delivery conveyor; to provide an improved tray construction for cooperation with the take-off mechanism; to provide improved means for tilting the trays and guiding them past the take-off mechanism; and to provide means for further cooling the baked goods as they move from the take-off mechanism to a collection station.

Still another object of the invention is to so arrange the various parts of the machine that the required lengths of the paths of travel of the baked goods through the cooling zones will not unduly enlarge the machine; it being an important objective to provide for performing all of the desired functions with a machine of the smallest possible over-all dimensions.

The apparatus of the invention, with which the foregoing objects may be achieved, preferably includes an oven, an adjacent preliminary cooling chamber containing a vertically directed fan or series of fans and having openings at the top to permit the escape of hot air; an endless chain conveyor carrying a multiplicity of trays spaced along the conveyor; means for guiding the travel of the conveyor along a path from the oven through the preliminary cooling chamber so that each tray is moved into, and upwardly with the stream of air from the fan or fans toward the top of the cooling chamber; and means for guiding the travel of the conveyor downwardly along a sloping path from the top of the cooling chamber past a take-off station. The apparatus also preferably includes a knife blade having a serrated knife edge disposed to slide over the baking surfaces of the trays for freeing baked goods therefrom, and means for conveying the freed baked goods through a second cooling zone at a reduced speed toward a collection station to cause further cooling of the baked goods before further handling of them is required.

A preferred manner in which the foregoing objects of the invention may be achieved is more fully disclosed in the following detailed description of an illustrative embodiment of the invention, and in the accompanying drawings in which:

Figure 1 is a fragmentary side elevation of a machine embodying the invention;

Fig. 2 is a vertical section through a portion of the machine of Fig. 1, the plane of the section being indicated by the line 2—2 in Fig. 1;

Fig. 3 is a fragmentary plan view of a portion of the machine of Fig. 1 taken as indicated by the line 3—3 in Fig. 1;

Fig. 4 is a fragmentary sectional view of the machine of Fig. 1, the plane of the section being indicated by the line 4—4 in Fig. 1;

Fig. 5 is a fragmentary vertical section of the machine of Fig. 1, the plane of the section being indicated by the line 5—5 of Fig. 4; and Fig. 6 is a fragmentary section on an inclined plane of a portion of the structure shown in Figs. 4 and 5, the plane of the section being indicated by the line 6—6 in Fig. 5.

Referring first to Fig. 1, the machine partially shown therein may be supported on a suitable base structure 1 and includes an oven structure 2 of any desired form. The oven structure preferably comprises suitably insulated top, end, and side walls enclosing any desired arrangement of gas burners, electrical burners, or the like, and appropriate baffles for supplying heat of the proper intensity to desired locations in the oven. For simplicity, only one end wall of the oven structure is shown in the drawings, since the other details of the oven design form no part of the present invention. This end wall includes an insulated inner wall 3a and an outer wall member 3b spaced from the insulated wall and extending somewhat therebelow to form a hot air duct for conducting heated air from the oven in the direction shown by a series of arrows toward a flue (not shown). The lower edge of the outer end wall member 3a may be spaced above the base 1 sufficiently to provide an outlet opening 4 at the bottom of the oven for an endless conveyor adapted to carry baked goods on trays along a tortuous path (not shown) through the oven and thence through a suitable preliminary cooling zone 5 to a take-off station 6 beyond the oven toward one end of the machine where the baked goods may be removed from the conveyor trays. From the take-off station 6 the conveyor may travel downwardly to the base 1, along the base to the opposite end of the machine (not shown), where the conveyor trays receive formed pieces of dough to be baked, and finally back into the oven structure to complete the endless path of the tray conveyor.

The portions of the machine referred to above as being shown in Fig. 1 are illustrated somewhat diagrammatically for simplicity. It will be understood, however, that the various parts of the machine are to be supported in the relationship described by any suitable structural framework, including side frame members 8, a top plate 9, an end plate 10, and a sloping grille plate 11, may be secured to form an attractive housing for the machine.

The tray conveyor preferably consists of a pair of endless chains 15 that carry a series of baking trays 16 uniformly spaced along the length of the chains. The chains 15 are disposed at opposite sides of the machine with the trays extending therebetween, and the chains run over oppositely disposed pairs of sprockets. The pairs of sprockets are appropriately located along the conveyor path for supporting and guiding the chains. In the portion of the machine to which the present invention relates, the series of sprockets for each of these chains 15 may include an idler sprocket 17 at the oven opening 4, successive idler sprockets 18 and 19 in the first cooling zone 5, successive idler sprockets 20 and 21 at opposite ends of the take-off station 6, and an idler sprocket 22 below the take-off station adjacent the base structure 1. The idler sprockets 17, 18, 19, 20, and 22 may be mounted on stub shafts carried by the frame of the machine but the idler sprocket 21 is preferably mounted on a through shaft 23 for purposes hereinafter described. Additional idler sprockets and a drive sprocket for each chain 15 may be provided at appropriate locations in the portion of the machine not shown and described herein. For a complete disclosure of such additional details, reference may be made to my above-mentioned copending application, Serial No. 170,588.

The baking trays 16 carried by the conveyor preferably comprise shallow inverted channels 26 closed at their ends by flanges 27, the trays preferably being pressed from a single sheet of material to avoid any necessity for welds which might cause distortion of the trays at elevated temperatures. Oppositely directed supporting pins 28 are mounted on the flanges 27 and project outwardly through the conveyor chains 15 so as to serve both as connecting pins between successive links of the chains and as pivotal supports for the trays.

To assist in holding the trays in horizontal positions during their travel, a weight in the form of a bar 30 is suspended below each tray by a pair of brackets 32 that may be welded or otherwise secured to the under side of the tray against the end flanges 27. The bar 30 may have reduced end portions 31 projecting into apertures in the brackets 32 for supporting the bars from the brackets.

To assist in holding dough on the trays in the event the trays are jarred or tilted slightly during their travel, the trays may be provided with indentations 33 extending substantially the full width of each tray as continuous or interrupted surface depressions. When individual slices of dough are dropped on the trays and are properly centered over the indentations 33, the dough flows into the indentations and tends to lock the dough to the tray surfaces after the dough has been baked to form a rigid cookie or the like.

As diagrammatically illustrated in Fig. 1, the conveyor chains 15 run horizontally out of the oven through the opening 4 in the end wall 3 and partially around the sprockets 17, and thence vertically and partially around the sprockets 18 located in the first cooling zone 5. There the path of the chains turns relatively abruptly and follows a gently sloping path in this cooling zone to the sprockets 19. The chains then run partially around the sprockets 19 and upwardly in the cooling zone 5 to the uppermost sprockets 20 adjacent the take-off station 6.

One or more motor driven fans 36 may be disposed in the lower portion of the first cooling zone 5 to provide an upwardly moving current of air that is exhausted through the sloping grille plate 11 at the top of this cooling zone. The motor driven fans 36 may be mounted on suitable transverse bars 37 directly below the sloping path between the sprockets 18 and 19 for cooling the trays 16 and thereby cooling the cookies on the trays. During passage of the trays through this cooling zone it is important that the trays and the bottoms of the cookies be cooled sufficiently so that the cookies can be removed from the trays at the take-off station 6 with a minimum of cookie breakage.

To obtain the maximum effect from the draft of air produced by the fans 36, the horizontal distance of travel of the trays along the path between the sprockets 18 and 19 is preferably approximately twice the length of a single tray, more or less (measured in the direction of horizontal travel), for a vertical distance of travel no greater than the center to center spacing of the trays along the chains. With such a relationship, the entire bottom of each tray is directly exposed to the draft of air from the fans 36 for a substantial interval of time. In addition, of course, further cooling of the trays and the cookies on the trays occurs during the remainder of the upward travel of the trays through the cooling zone 5.

At the uppermost sprockets 20, the chains turn through an angle of nearly 180° for moving the trays downwardly along a rather steeply inclined path past the take-off station 6. While the trays are moving around the sprockets 20, the leading edges of the trays engage curved cam surfaces 39 on a pair of cam plates 40 that are mounted on opposite sides of the frame of the machine in the path of the end portions of the trays, as most clearly shown in Fig. 6. These cam surfaces 39 positively tilt the trays during the remainder of their travel about the uppermost sprockets 20 and orient the baking surfaces of the trays parallel to the inclined chain path between the sprockets 20 and 21.

When the trays have been tilted as described, they are held in their tilted position for a substantial interval of travel by straight guide surfaces 41 on the cam plates 40. To insure accurate alignment of the trays during this interval and during the remainder of their travel past the take-off station 6, the trays are engaged by a pair of spring cushioned pressure pads 42. These pressure pads are also respectively mounted on opposite sides of the machine and are disposed in alignment with the cam plates 40.

The pair of pressure pads 42 are preferably made of a non-metallic material suitably secured to respective supporting bars 43. Bolts 44, having their heads recessed in the supporting bars 43, project through the supporting bars and through aligned apertures in flanges of a pair of angle brackets 46. The angle brackets 46 are disposed parallel to and spaced from the supporting bars 43 and are respectively mounted in fixed positions on side frame members 8 by a plurality of studs 47. The studs 47 pass through elongated apertures 48 in side frame members 8 so as to permit adjustment of the positions of the supporting bars 46 toward and away from the cam plates 40. Helical springs 49 surround the bolts 44 and are held under axial compression between the bottoms of the supporting bars 43 and the parallel flanges of the angle brackets 46 so as to urge the pressure pads 42 against the brackets 32 on the bottoms of the trays.

As the leading edges of the trays pass the lower ends of the straight guide surfaces 41 on the cam plates 40, they slide under a knife blade 50 having a large scale, serrated or saw-toothed, upper edge configuration, as shown in Figs. 4 and 5. The knife blade 50 is disposed in a fixed position substantially parallel to the inclined trays and extends transversely of the machine so as to slide over substantially the entire width of the trays for removing cookies therefrom as the trays travel under the knife blade.

As shown in Fig. 4, baked cookies 51 may be disposed in spaced-apart relation in a straight line extending centrally across each tray. The knife edge of the blade 50, by reason of its saw-tooth configuration, is composed of a plurality of knife edge portions 52 disposed at acute angles to the direction of travel of the trays and substantially in the inclined plane of their baking surfaces. The saw-tooth configuration of the knife blade 50 is so proportioned that the junctures of the knife edge portions 52 are disposed opposite the spaces between cookies on the trays. Each knife edge portion 52 engages a single cookie on each tray in such a manner as to wedge under the cookie for prying it free from the tray. By reason of the inclination of the knife edge portions 52 with respect to the direction of travel of the cookies, the knife edges impart a rotary motion to the cookies about their axes normal to the trays while prying them free from the trays. This action has been found to be highly effective in removing the cookies from the trays with a minimum of cookie breakage, take-off clogging, jamming, etc.

The knife blade 50 may be mounted at its opposite ends on angle brackets 53 by means of studs 54; and the brackets may in turn be mounted on the side frame members 8 by additional studs or bolts 56. A pair of spaced parallel studs 57 are adjustably mounted in a transverse bracket 58, suitably secured at its opposite ends to the side frame members 8 by bolts 59, and the studs 57 are adjusted to bear endwise against the upper surfaces of the knife blade 50 to assist in holding it in alignment and causing the knife edge portions thereof to closely hug the baking surfaces of the trays 16.

Throughout the interval of travel of the trays 16 along the straight guide surfaces 41 on the cam plates 40, and throughout the interval of travel of the trays past the knife blade 50, the pressure pads 42 hold the trays firmly against the guide surfaces 41 and against the knife blade 50 with a yielding pressure and maintain the trays in accurate alignment in their inclined positions.

When the cookies are freed from the trays by the knife blade 50, they slide downwardly by gravity over the knife blade and down a chute or slide below the knife blade. This chute or slide may be formed by a number of closely spaced wires 61 that are curved to provide a slide of gradually decreasing slope for gently decelerating the cookies and delivering them onto an auxiliary, endless belt type conveyor 65. The spacing of the wires 61 permits free passage of air from the fan 36 through the slide between the wires 61 for additional cooling of the cookies.

The upper ends of the wires 61 may be secured to the lower edge of the knife blade 50 in any desired manner. As shown in Fig. 5, these ends of the wires are inserted in apertures in the lower edge of the knife blade where they may be held by suitable welds (not shown). Adjacent their lower ends, the wires 61 may be supported on a transversely extending rod 62 that is supported at its opposite ends on portions of the frame of the machine.

The auxiliary conveyor 65 may be mounted in a suitable frame comprising a pair of side frame members 68 attached to the end of the main frame of the machine in any desired manner. As shown in Figs. 1 and 2, the auxiliary conveyor may be supported by a pair of symmetrical brackets 69 respectively cast integrally with the opposite side frame members 68 for supporting one end of the conveyor below the lower ends of the slide wires 61, and an identical pair of symmetrical brackets 70 respectively cast integrally with the side frame members 68 adjacent the opposite end of the auxiliary conveyor. Referring to the first mentioned pair of brackets 69, they are respectively apertured to receive the shanks of a pair of I-bolts 71, the shanks of the I-bolts being threaded and held in longitudinal adjustment by a pair of nuts 72 on each I-bolt shank on opposite sides of its bracket 69. The eye portion of the I-bolts 71 serve as bearings for a transverse shaft 73 carrying a transverse roller 74. The other pair of brackets 70 at the opposite end of the conveyor 65 adjustably support another pair of oppositely directed I-bolts 75 in the same manner. The latter pair of I-bolts 75 serves as bearings for a second transverse shaft 76 carrying a second roller 77.

An endless belt 78, made of a suitable, open mesh, screen material, passes around the conveyor rollers 74 and 77 for receiving cookies from the slide wires 61 and conveying the cookies to the collection station 66. There the cookies are discharged from the conveyor into a suitable receptacle 79 mounted between the side plates 68 on any suitable support 80.

The tension in the screen belt 78 and the positions of the rollers 74 and 77 longitudinally of the conveyor may be controlled by adjusting the positions of the shanks of the I-bolts 71 and 75 in the castings 69 and 70, as permitted by the pairs of nuts 72.

To assist in supporting the screen belt 78 between the rollers 74 and 77, a number of longitudinally extending bars 81 may be mounted in parallel, spaced-apart relation with their opposite ends supported on the castings at 69 and 70. The upper reach of the screen belt 78 may rest on and slide along these bars, and any material sagging of the upper reach of the belt is thereby prevented.

The conveyor belt is driven by means of the roller 74 adjacent the take-off station 6, this roller being in turn driven with its shaft 73 by a sprocket 82 fixed to one end of the shaft. The sprocket 82 on the roller shaft 73 is coupled by means of a driving chain 83 to a driving sprocket 84 on the through shaft 23 carrying the main conveyor sprockets 21 immediately below the take-off station 1. Thus the auxiliary conveyor 65 is driven at a speed having a predetermined timed relationship to the speed of the main conveyor chains 15. This relationship is determined by the relative sizes of the driving and driven sprockets 84 and 82, and the sizes of these sprockets are preferably selected to move the auxiliary conveyor belt 65 at a substantially slower speed than the main conveyor chains 15 in order to space the cookies more closely on the auxiliary conveyor than they were spaced on the main conveyor. In this manner, the time of travel of the cookies along the auxiliary conveyor may be extended to increase the extent of final cooling of the cookies obtainable with an auxiliary conveyor of a given length. This final cooling of the cookies is facilitated by a second motor driven fan or fans 86 mounted below the auxiliary conveyor on a suitable transversely extending support 87 carried by the side plates 68. The fans 86 create a draft of air that passes upwardly through the openings of the screen belt 78 and against the cookies carried by the screen belt.

As can best be seen from Fig. 5, the trays 16 are held in their tilted positions by contact with the pressure pads 42 until the chains 15 begin to turn around the idler sprockets 21. As the trays move around the axis 23 of the sprockets 21, they swing back to their normal horizontal positions while engaged by a limiting cam 85, which controls the swinging movement and stops it when the trays are horizontal. The downwardly moving trays are then promptly engaged by curved cam surfaces 88 on the upper ends of a pair of elongated, vertically extending, guide cams 89. The cam surfaces 88 are shaped to tilt the trays in the opposite direction until they are oriented in the vertical positions which they occupy during their downward travel between the idler sprockets 21 and 22, as best shown in Fig. 1. After being tilted to their vertical positions, the trays are retained in such positions during the remainder of their downward travel by straight guide surfaces 90 on the cams 89. By maintaining the trays in their vertical position while they travel between the sprockets 21 and 22, the horizontal space which they occupy in the cooling zone 5 is kept to a minimum and additional room is provided to accommodate the fans 36 and for the offset in the path of the main conveyor between the sprockets 18 and 19 in the cooling zone 5.

From the foregoing description of an illustrative embodiment of the present invention, it will be observed that cookies moving out of the oven through the opening 4 are efficiently cooled during their passage through the first cooling zone 5 by means of a draft of air from the fans 36. This cooling of the cookies continues during their travel upwardly to the top of the cooling zone 5 and downwardly along the inclined path past the take-off station 6, where the cookies are removed from the trays by the knife blade 50.

By reason of the preliminary cooling of the cookies in the cooling zone 5 and the special configuration of the knife edge portions 52 of the blade 50, cookies that are stuck to the trays are freed therefrom with a minimum of cookie breakage. As the cookies slide by gravity from the trays over the knife blade 50 and are gently decelerated by the slide wires 61, they are contacted by additional cooling air passing from the fans 36 upwardly between the slide wires.

Upon being discharged from the slide wires 61 onto the auxiliary conveyor 65, the cookies are spaced as closely as possible along the length of the auxiliary conveyor by selecting the proper ratio between the speed of the auxiliary conveyor and the speed of the main conveyor. During their relatively slow travel on the auxiliary conveyor the cookies are subjected to final cooling by the draft of air from the fans 86, and are finally discharged into a collection receptacle 79, or may be manually removed from the auxiliary conveyor if desired.

By means of the construction and arrangement of the various parts of the machine described in detail above, the several objects of the invention are accomplished efficiently and in a very simple manner, and the difficult problem of removing cookies from the baking trays and delivering them to a final collection station with a minimum of breakage is admirably solved.

Having described the invention and its mode of operation in detail, I claim:

1. In a machine of the class described, including a pair of endless conveyor chains disposed in parallel, spaced-apart, horizontal alignment, a series of baking trays having generally flat, rimless baking surfaces extending horizontally between and pivotally connected to said chains for movement therewith while being freely rotatable about a horizontal axis, said trays being counterbalanced for normally holding their baking surfaces horizontal, and means for moving said chain and trays along a closed path; the combination of means for guiding said chains downwardly along an inclined path, means for positively tilting said trays and holding their baking surfaces parallel to said inclined path as they pass therealong, and a knife blade disposed substantially parallel to said path and having a knife-edge directed generally opposite to the direction of movement of the conveyor, said knife-edge being disposed substantially in the inclined plane of the baking surfaces of the trays as they travel along said inclined path for wedging under baked goods adhering to the trays to free them from the trays.

2. The combination of claim 1 in which said knife-edge has a saw tooth configuration providing a plurality of angularly disposed knife-edge portions for engaging baked goods on the trays, said angularly disposed knife-edge portions extending at acute angles to the direction of travel of the trays past the knife blade for imparting a rotative force to said baked goods while prying them free from the trays.

3. In a machine of the class described, including an endless conveyor having a series of baking trays spaced therealong for movement therewith, said conveyor being mounted for travel from an oven zone through a first cooling zone to a take-off mechanism for removing baked goods from the trays, means at said take-off station for freeing baked goods from said trays for downward movement to a second cooling zone, a belt type conveyor in said second cooling zone, and a slide disposed to receive baked goods freed from said trays and deliver them onto said belt type conveyor, said slide having a plurality of closely spaced openings therethrough to provide a grille-like supporting surface through which air may freely flow for further cooling the baked goods as they slide down said supporting surface, and means for directing a draft of air through said first cooling zone and toward said slide.

4. In a machine of the class described, including an endless conveyor carrying a series of baking trays downwardly along an inclined path with the baking surfaces of the trays parallel to said path, a stationary knife blade disposed substantially parallel to the inclined plane of the baking surfaces of the trays, said knife blade having a knife-edge extending generally transversely with respect to said path and directed opposite to the direction of travel of the trays, and said knife-edge being disposed substantially in the inclined plane of the baking surfaces of the trays for sliding therealong to remove baked goods therefrom, and a slide extending downwardly from said knife blade along a curved path of gradually decreasing inclination, for conveying said baked goods downwardly from said knife blade, said slide being formed of a plurality of spaced parallel wires that extend downwardly along said curved path, whereby a draft of air may be passed through the slide between said wires for cooling baked goods moving down the slide.

5. In a machine of the class described, including means for moving a series of baking trays carrying baked goods downwardly along an inclined path with the baking surfaces of the trays parallel to said path, a knife blade disposed substantially parallel to the inclined plane of the baking surfaces of the trays and having a knife-edge extending generally transversely with respect to said path, said knife-edge being disposed substantially in the inclined plane of the baking surfaces of said trays and being directed opposite to the direction of travel of the trays for sliding therealong to remove baked goods therefrom, and a slide for receiving baked goods removed from the trays by said knife blade, said slide comprising a plurality of spaced parallel wires having upper end portions disposed generally parallel to the direction of travel of said trays and abutting the lower edge of said blade, said wires extending downwardly from their upper ends along a path of gradually decreasing inclination for decelerating said baked goods and delivering them onto a substantially horizontal plane.

6. In a machine of the class described, including means for moving a series of baking trays carrying baked goods downwardly along an inclined path with the baking surfaces of the trays parallel to said path, a knife blade disposed substantially parallel to the inclined plane of the baking surfaces of the trays and having a knife-edge extending generally transversely with respect to said path, said knife-edge being disposed substantially in the inclined plane of the baking surfaces of said trays and being directed opposite to the direction of travel of the trays for sliding therealong to remove baked goods therefrom, and a slide having its upper end disposed generally parallel to said blade and adjoining the lower edge thereof, said slide extending downwardly from said blade along a curved path of gradually decreasing slope for decelerating said baked good and delivering them onto a substantially horizontal surface.

7. In a machine of the class described, including means for moving a series of baking trays carrying baked goods downwardly along an inclined path with the baking surfaces of the trays parallel to said path, a knife blade disposed substantially parallel to the inclined plane of the baking surfaces of the trays and having a knife-edge extending generally transversely with respect to said path, said knife-edge being disposed substantially in the inclined plane of the baking surfaces of said trays and being directed opposite to the direction of travel of the trays for sliding therealong to remove baked goods therefrom, and a slide having its upper end disposed generally parallel to said blade and adjoining the lower edge thereof, said slide extending downwardly from said blade along a curved path of gradually decreasing slope for decelerating said baked good and delivering them onto a substantially horizontal surface, a conveyor extending generally horizontally from the lower end of said slide for receiving baked goods therefrom and conveying them to a collection station, said conveyor being of the endless belt type in which said belt is an air pervious material, and means for directing a draft of air upwardly through said belt for cooling baked good traveling thereon.

8. In a machine of the class described, an endless conveyor carrying a series of baking trays uniformly spaced along the length thereof for transporting baked goods from an oven to a take-off station where baked goods are removed from the trays, a stationary knife blade disposed substantially parallel to the baking surfaces of the trays at said take-off station, said knife blade having a knife-edge extending generally transversely with respect to the path of travel of the trays at said take-off station, said knife-edge being directed generally opposite to the direction of travel of the trays along said path and being disposed substantially in the plane of the baking surfaces of the trays for sliding against said baking surfaces to free baked goods therefrom, and said knife-edge being composed of a series of angularly disposed knife-edge lengths inclined at acute angles to the direction of travel of the trays along said path.

9. In a machine of the class described, a pair of parallel endless conveyor chains carrying therebetween a series of baking trays uniformly spaced along the length thereof, said baking trays having generally flat, rimless baking surfaces and being pivotally mounted on said chains for free rotation about an axis transverse with respect thereto, counterbalance means for normally holding said baking surfaces horizontal, means guiding said chains downwardly along an inclined path past a take-off station for removing baked goods from the trays, means for positively tilting said trays and holding them at the inclination of said path as they move therealong, a stationary knife blade at said take-off station disposed substantially parallel to the inclined baking surfaces of the trays on said path, said knife blade having a knife-edge extending generally transversely with respect to said path, said knife-edge being directed generally opposite to the direction of travel of the trays along said path and being disposed substantially in the inclined plane of the baking surfaces of the trays for sliding against said baking surfaces to free baked goods therefrom, and said knife-edge being composed of a series of angularly disposed knife-edge lengths inclined at an acute angle to the direction of travel of the trays along said path.

References Cited in the file of this patent
UNITED STATES PATENTS

| | | |
|---|---|---|
| 864,438 | Szczys | Aug. 27, 1907 |
| 1,246,515 | Young | Nov. 13, 1917 |
| 1,279,563 | Lowell | Sept. 24, 1918 |
| 1,351,018 | Blando | Aug. 31, 1920 |
| 1,521,416 | Ayres | Dec. 30, 1924 |
| 1,768,534 | Aiken | July 1, 1930 |
| 1,858,732 | Farnham | May 17, 1932 |
| 1,979,553 | Hunter | Nov. 6, 1934 |
| 2,073,221 | Reece et al. | Mar. 9, 1937 |
| 2,503,437 | Fox | Apr. 11, 1950 |
| 2,597,271 | Williams | May 20, 1952 |
| 2,625,284 | Atwood | Jan. 13, 1953 |